United States Patent [19]
Van Dyke et al.

[11] Patent Number: 5,623,614
[45] Date of Patent: Apr. 22, 1997

[54] BRANCH PREDICTION CACHE WITH MULTIPLE ENTRIES FOR RETURNS HAVING MULTIPLE CALLERS

[75] Inventors: Korbin S. Van Dyke, Fremont; Larry Widigen, Salinas; David L. Puziol, Sunnyvale, all of Calif.

[73] Assignee: Advanced Micro Devices, Inc., Sunnyvale, Calif.

[21] Appl. No.: 122,922

[22] Filed: Sep. 17, 1993

[51] Int. Cl.$^6$ .................................... G06F 9/42
[52] U.S. Cl. .................... 395/587; 364/DIG. 1
[58] Field of Search ............................... 395/375

[56] References Cited

U.S. PATENT DOCUMENTS

| | | |
|---|---|---|
| 4,399,507 | 8/1983 | Cosgrove et al. |
| 4,725,947 | 2/1988 | Shonai et al. |
| 4,872,109 | 10/1989 | Horst et al. |
| 5,093,778 | 3/1992 | Favor et al. |
| 5,136,696 | 8/1992 | Beckwith et al. |
| 5,226,126 | 7/1993 | McFarland et al. |
| 5,226,130 | 7/1993 | Favor et al. |
| 5,230,068 | 7/1993 | Van Dyke et al. |
| 5,276,882 | 1/1994 | Emma et al. ............ 395/700 |
| 5,414,822 | 5/1995 | Saito et al. ............ 395/375 |
| 5,434,985 | 7/1995 | Emma et al. ............ 395/375 |
| 5,454,087 | 9/1995 | Narita et al. ............ 395/375 |
| 5,454,090 | 9/1995 | Fleck et al. ............ 395/375 |

OTHER PUBLICATIONS

Peter M. Kogge; "The Architecture of Pipelined Computers"; McGraw–Hill; 1981; Section 6.6.2.

J.L. Hennessy and D.A. Patterson; "Computer Architecture, A Quantitiative Approach"; Morgan Kaufmann; 1990; Section 6.7.

D.R. Ditzel and H.R. McLellan; "Branch folding in the CRISP microprocessor: Reducing the branch delay to zero"; Proceedings of the 14th Symposium on Computer Architecture; Jun. 1987; Pittsburg; pp. 2–7.

J.K.F. Lee and A.J. Smith; "Branch Prediction Strategies and Branch Target Buffer Design"; IEEE Computer; vol. 17; Jan. 1984; pp. 6–22.

Harvey G. Cragon; "Branch Strategy Taxonomy and Performance Models"; IEEE Computer Society Press; 1992; Chapter 4.

C.O. Stjernfeldt; E.W. Czeck, and D.R. Kaeli; "Survey of Branch Prediction Strategies"; Northeastern University technical report CE–TR–93–05; Jul. 28, 1993.

Advanced Micro Devices; "AM29050 Microprocessor User's Manual"; 1991.

John S. Liptay; "Design of the IBM Enterprise System/9000 high–end processor"; IBM Journal of Research and Development; Jul. 1992; vol. 36, No. 4; p. 713(19).

Chris H. Perleberg & Alan J. Smith; "Branch Target Buffer Design and Optimization"; IEEE Transactions on Computers; vol. 42, No. 4; Apr. 1993; pp. 396–412.

(List continued on next page.)

*Primary Examiner*—William M. Treat
*Assistant Examiner*—Amare Assefa
*Attorney, Agent, or Firm*—Walstein Bennett Smith, III

[57] ABSTRACT

A Branch Prediction Cache (BPC) selects from among multiple branch address entries for a single return-type instruction that returns to multiple callers. The BPC has a branch address associative memory, a return address associative memory, and word line logic used to validate and qualify entries. The branch address associative memory monitors program addresses for previously stored branch addresses. The return address stack (RtnStack) stores the return addresses for the most recent call-type instructions. The top of the stack is input to the return address associative memory. When a program address has multiple matches in the branch address associative memory, the return address associative memory enables only the entry that has an associated return address matching the top of the RtnStack. In an alternate embodiment, the return address associative memory is combined with a branch address cache and target address associative memory.

25 Claims, 7 Drawing Sheets

OTHER PUBLICATIONS

D.R. Kaeli and P.G. Emma; "Branch History Table Prediction of Moving Target Branches Due to Subroutine Returns"; The 18th Annual International Symposium on Computer Architecture; vol. 19, No. 3; May 1991; pp. 34–42.

Robert M. Supnik; "Digital's Alpha Chip Project"; Communications of the ACM; Feb. 1993; vol. 36, No. 2; pp. 30–44.

Brian Case; "Intel Reveals Pentium Implementation Details"; Microprocessor Report; MicroDesign Resources; Mar. 29, 1993; pp. 7–12 thru 7–20.

Marc Rose; "Structured Control Flow: An Architectural Technique for Improving Control Flow Performance"; 29 Nov. 1983 Dept. of Electrical & Computer Engr.; Carnegie–Mellon Univ.; pp. 1–71; (pp. 33 & 58 are missing).

"Subroutine Call/Return Stack"; IBM Technical Disclosure Bulletin; vol. 30, No. 11; Apr. 1988; pp. 221–225.

BRANCH PREDICTION CACHE WITH MULTIPLE ENTRIES FOR RETURNS HAVING MULTIPLE CALLERS

FIELD OF THE INVENTION

The invention relates to reducing pipeline delays in high performance processors via the caching of information related to control transfer instructions. More particularly, the invention relates to the use of a return address stack in combination with a branch prediction cache to increase total branch prediction accuracy by reducing mispredictions for return instructions.

BACKGROUND

Pipeline processors decompose the execution of instructions into multiple successive stages, such as fetch, decode, and execute. Each stage of execution is designed to perform its work within the processor's basic machine cycle. Hardware is dedicated to performing the work defined by each stage. As the number of stages is increased, while keeping the work done by the instruction constant, the processor is said to be more heavily pipelined. Each instruction progresses from stage to stage, ideally with another instruction progressing in lockstep only one stage behind. Thus, there can be as many instructions in execution, as there are pipeline stages.

The major attribute of a pipelined processor is that a throughput of one instruction per cycle can be obtained, though when viewed in isolation, each instruction requires as many cycles to perform as there are pipeline stages. Pipelining is viewed as an architectural technique for improving performance over what can be achieved via process or circuit design improvements.

The increased throughput promised by the pipeline technique is easily achieved for sequential control flow. Unfortunately, programs experience changes in control flow as frequently as one out of every three executed instructions. Taken branch instructions are a principal cause of changes in control flow. Taken branches include both conditional branches that are ultimately decided as taken and unconditional branches. Taken branches are not recognized as such until the later stages of the pipeline. If the change in control flow were not anticipated, there would be instructions already in the earlier pipeline stages, which due to the change in control flow, would not be the correct instructions to execute. These undesired instructions must be cleared from each stage. In keeping with the pipeline metaphor, the instructions are said to be flushed from the pipeline.

The instructions to be first executed where control flow resumes following a taken branch are termed the branch target instructions (target instructions). The first of the target instructions is at the branch target address (target address). If the target instructions are not introduced into the pipeline until after the taken branch is recognized as such and the target address is calculated, there will be stages in the pipeline that are not doing any useful work. Since this absence of work propagates from stage to stage, the term pipeline bubble is used to describe this condition. The throughput of the processor suffers whenever such bubbles occur.

Branch Prediction Caches (BPCs), also known as Branch Target Buffers (BTBs), are designed to reduce the occurrence of pipeline bubbles by anticipating taken branches. BPCs store information about branches that have been previously encountered. An Associative Memory is provided in which an associatively addressed tag array holds the address (or closely related address) of recent branch instructions. The data fields associated with each tag entry may include information on the target address, the history of the branch (taken/not taken), and branch target instruction bytes. The history information may take the form of N-bits of state (N is typically 2), which allows an N-bit counter to be set up for each branch tracked by the BPC.

The fetch addresses used by the processor are coupled to the branch address tags. If a hit occurs, the instruction at the fetch address causing the hit is presumed to be a previously encountered branch. The history information is accessed and a prediction on the direction of the branch is made based on a predetermined algorithm. If the branch is predicted not taken, then the pipeline continues as usual for sequential control flow. If the branch is predicted taken, fetching is performed from the target address instead of the next sequential fetch address. If target instruction bytes were cached, then these bytes are retrieved directly from the BPC. Because of using a BPC, many changes in control flow are anticipated, such that the target instructions of taken branches contiguously follow such branches in the pipeline. When anticipated correctly, changes in control flow due to taken branches do not cause pipeline bubbles and the associated reduction in processor throughput. Such bubbles occur, only when branches are mispredicted. Conventionally, instructions fetched from the predicted direction (either taken or not-taken) of a branch are not allowed to modify the state of the machine unit the branch direction is resolved. Operations normally may only go on until time to write the results in a way that modifies the programmer visible state of the machine. If the branch is actually mispredicted, then the processor can flush the pipeline and begin anew in the correct direction, without any trace of having predicted the branch incorrectly. Further instruction issue must be suspended until the branch direction is resolved. A pipeline interlock is thus provided to handle this instruction dependency. Waiting for resolution of the actual branch direction is thus another source of pipeline bubbles.

It is possible to perform speculative execution (also known as conditional, or out-of-order execution) past predicted branches, if additional state is provided for backing up the machine state upon mispredicted branches. Speculative execution beyond an unresolved branch can be done whether the branch is predicted taken or not-taken. An unresolved branch is a branch whose true taken or not-taken status has yet to be decided. Such branches are also known as outstanding branches.

Pipelining was extensively examined in "The Architecture of Pipelined Computers," by Peter M. Kogge (McGraw-Hill, 1981). A more recent treatment was provided by chapter 6 of "Computer Architecture, A Quantitative Approach," by J. L. Hennessy and D. A. Patterson (Morgan Kaufmann, 1990). Branch prediction and the use of a BTB are taught in section 6.7 of the Hennessy text. The Hennessy text chapter references provided pointers to several notable pipelined machines and for several contemporary papers on reducing branch delays. D. R. Ditzel and H. R. McLellan, "Branch folding in the CRISP microprocessor: Reducing the branch delay to zero," Proceedings of the 14th Symposium on Computer Architecture, June 1987, Pittsburgh, pg. 2–7, provided a short historical overview of hardware branch prediction. J. K. F. Lee and A. J. Smith, "Branch Prediction Strategies and Branch Target Buffer Design," IEEE Computer, Vol. 17, January 1984, pg. 6–22, provided a thorough introduction to branch prediction. Three more recent works include 1) "Branch Strategy Taxonomy and Performance Models," by Harvey G. Cragon (IEEE Computer Society Press, 1992), 2) "Branch Target Buffer Design and Optimization," by C. H. Perleberg and A. J. Smith, IEEE Transactions on Computers, Vol. 42, April 1993, pg. 396–412, and 3) "Survey of Branch Prediction Strategies," by C. O. Stjernfeldt, E. W. Czeck, and D. R. Kaeli (Northeastern University technical report CE-TR-93-05, Jul. 28, 1993).

Several recent commercial machines have employed branch prediction. The AMD Am29050 (TM) Microprocessor had a 256-entry Branch Target Cache (BTC) that cached target addresses and target instruction bytes. The operation of the Am29050 BTC was described in the Am29050 Microprocessor User's Manual, 1991. A similar BTC was used in the GE RPM40, according to Perleberg and Smith. Perleberg and Smith also reported that the Mitsubishi M32 had a BTB that cached prediction information, branch addresses, and target instruction bytes. The IBM Enterprise System/9000 (TM) 520-based models had a 4096-entry Branch History Table (BHT) that cached branch addresses and target addresses. The operation of the 520-based machines was described in the July 1992 issue of the IBM Journal of Research and Development. The Intel Pentium (TM) Microprocessor had a 256-entry BTB that cached branch addresses, target addresses, and 2-bits of history information. This operation of the Pentium BTB was described in the Mar. 29, 1993 issue of Microprocessor Report (MicroDesign Resources, 1993).

The principles of out-of-order execution are also well known in the art. As background, out-of-order execution in the IBM System/360 Model 91 was discussed in section 6.6.2 of Kogge. The January 1967 issue of the IBM Journal of Research and Development was devoted to the Model 91. More recently, the aforementioned IBM Enterprise System/9000 520-based models performed speculative execution.

U.S. Pat. No. 5,226,126, ('126) PROCESSOR HAVING PLURALITY OF FUNCTIONAL UNITS FOR ORDERLY RETIRING OUTSTANDING OPERATIONS BASED UPON ITS ASSOCIATED TAGS, to McFarland et al., issued Jul. 6, 1993, which is assigned to the assignee of the present invention, described speculative execution in the system in which the instant invention is used, and is hereby incorporated by reference.

U.S. Pat. No. 5,093,778, ('778) INTEGRATED SINGLE STRUCTURE BRANCH PREDICTION CACHE, to Favor et al., issued Mar. 3, 1992, which is assigned to the assignee of the present invention, teaches the implementation of the various components comprising a branch prediction cache as one integrated structure, and is hereby incorporated by reference. An integrated structure provides for reduced interconnect delays and lower die costs, due to smaller size. The '778 BPC was designed for use in a processor that uses out-of-order (speculative) execution. The '778 BPC caches branch addresses, history information, target addresses, and target instruction bytes.

U.S. Pat. No. 5,226,130 ('130) METHOD AND APPARATUS FOR STORE-INTO-INSTRUCTION-STREAM DETECTION AND MAINTAINING BRANCH PREDICTION CACHE CONSISTENCY, to Favor et al., issued Jul. 6, 1993, which is assigned to the assignee of the present invention, teaches the use of a BPC for detecting stores into the instruction stream and stores to instructions held within the BPC, and is hereby incorporated by reference.

U.S. Pat. No. 5,230,068 ('068) CACHE MEMORY SYSTEM FOR DYNAMICALLY ALTERING SINGLE CACHE MEMORY LINE AS EITHER BRANCH TARGET ENTRY OR PREFETCH INSTRUCTION QUEUE BASED UPON INSTRUCTION SEQUENCE, to Van Dyke et al., issued Jul. 20, 1993, which is assigned to the assignee of the present invention, teaches the use of lines in the BPC for either branch target entries or as instruction queues, and is hereby incorporated by reference.

BPCs have previously maintained a single entry in the tag array for each branch address. In the data fields associated with each branch address tag was a single target address. This target address can change for a variety of reasons. Such changes are not discoverable until late in the pipeline. If the target address is different from that held in the BPC, it is said to be a mispredicted target address. If the target address is mispredicted the target instruction bytes associated with the address will also be incorrect. This is true whether or not the target bytes were cached. A mispredicted target address will result in a pipeline bubble just as a mispredicted direction would.

Return (RET or RTN) instructions pose a problem for the previously described BPC-based branch prediction approaches. RTN instructions are unconditional transfers that terminate subroutines by transferring control flow back to the instruction immediately following the CALL instruction that invoked the subroutine. The address of the instruction after the Call, called the return address, is commonly stored on a stack maintained in the main memory of the processor. Generally subroutines are called from many different program locations. Because of having multiple callers, there can be multiple target address associated with a RTN. Because the target address can be constantly changing, RTNs can be constantly mispredicted. The BPC will update the target address upon every misprediction, possibly thrashing between a fixed set of two or more addresses in a "ping-pong" like manner.

The reduction of branch delays associated with return instructions was addressed in U.S. Pat. No. 4,399,507 ('507), INSTRUCTION ADDRESS STACK IN THE DATA MEMORY OF AN INSTRUCTION-PIPELINED PROCESSOR, to Cosgrove et al., issued Aug. 16, 1983. This invention teaches the on-chip caching (in the processor) of the top of a return address stack, the stack being kept in off-chip storage. When a fetched instruction is recognized as being a return instruction, the on-chip return address storage permits directly fetching the target of the return. It is not necessary to first fetch the return address from off-chip storage.

A first significant aspect of the '507 approach is that it makes no provision for branches other than return instructions. A second significant aspect of this invention is that only the return address for a single RET instruction is cached on-chip. Following a RET, the on-chip return address cache is updated using otherwise unused pipeline cycles. In more general or aggressive implementations, such unused cycles may not be available. A third significant aspect of this approach is that the RET instruction must proceed to the stage at which decoding is performed before the target instruction bytes can be fetched. A fourth significant aspect of this approach is that no provisions are made for caching target instruction bytes.

The problem of multiple target addresses for a given branch address was addressed previously in U.S. Pat. No. 4,725,947 ('947), DATA PROCESSOR WITH A BRANCH TARGET INSTRUCTION STORAGE, to Shonai et al., issued Feb. 16, 1988. This invention teaches the use of a 128K-entry two-way set-associative target instruction cache whose tags include register specifier fields from the branch instruction along with the branch address. The register specifier fields are those that would be used by the branch instruction to generate the target address. Every taken branch is cached and the entry marked valid. If there is a tag hit, the branch is predicted taken and the cached target instruction bytes are provided directly to the instruction buffer, avoiding the need to fetch the target bytes. Hits on branches that are subsequently not taken, cause the tag to be invalidated, such that subsequent hits are not possible. Upon every hit, whether the branch is taken or not, all fields except the valid bit are rewritten as part of the LRU-Replacement scheme.

A first significant aspect of the '947 approach is that the register specifier fields of the branch instruction are not available initially. As a result, the branch instruction must proceed to the stage at which partial decoding is performed before the CAM can be accessed. A second significant aspect of this approach is that it makes no provision for distinguishing between multiple target addresses for a RET instruction, which has no register specifier fields for generating the target address. The target address associated with a RET instruction must be retrieved from the stack. A third significant aspect of '947 is that, other than the RAM array itself, it does not represent an integrated solution.

The difficulty of correctly predicting branch target addresses associated with the subroutine call/return paradigm was dealt with in "Branch History Table Prediction of Moving Target Branches Due to Subroutine Returns," by D. R. Kaeli and P. G. Emma, in Proceedings of the 18th Annual International Symposium on Computer Architecture, 1991, pgs. 34–42. Kaeli and Emma proposed and simulated a Branch History Table (BHT) used in conjunction with separate Call and Return "Stacks."

The stacks were rather unconventional. In addition to implementing conventional push-down behavior, it was implied that the Call and Return Stacks were also fully associative memories. In the event of a hit, an entry at any depth could be read. In the event of multiple tag matches, it was further impled that priority logic was used to qualify only the topmost matching entry. Furthermore, corresponding entries in the two stacks were bidirectionally coupled with each other. The purpose of the coupling was to permit a hit in the Return Stack to be used to read an entry from the Call stack, and vice versa.

The BHT was largely conventional, having fields for branch and target addresses and "predictions." The only modification to the BHT was the addition of a new bit field that could designate each entry as special. If an entry was designated as special, the target address field held a key used to access the Call Stack. If an entry was not special, the target address field supplied the target address directly, as was done conventionally.

In the absence of Call and Return instructions, the BHT functioned conventionally. In addition to establishing a conventional entry in the BHT, Call instructions caused the target address of the Call (the start of the subroutine) to be pushed onto the Call Stack and the return address (the next sequential address after the Call) to be pushed onto the Return Stack.

Executing Return instructions caused a special entry to be established in the BHT, when one did not previously exist. Specifically, the target address for the return (the previously mentioned return address) was presented to the Return Stack to check for a hit. In the event of a hit, the target address in the corresponding entry in the Call Stack supplied the target address for the BHT entry. The BHT entry was marked as special.

Once a special entry had been established, a hit in the BHT would occur next time the same Return address was prefetched. Handling of the hit was modified due to the entry being marked special. As mentioned previously, the target address field was presented to the Call Stack to check for a hit. In the event of a hit, the target address in the corresponding entry in the Return Stack supplied the target address used for the prediction.

In summary, in the Kaeli and Emma approach, subroutine returns were specially designated in the BHT. Only one entry was established in the BHT for each subroutine return. The target address for subroutine returns came not from the BHT, but from the linked Call/Return Stacks. A first significant aspect of the Kaeli and Emma approach is that only one entry is maintained in the branch prediction cache for a return instruction, no matter how many callers the subroutine may have. A second significant aspect is that no provisions are made for the caching of target instruction bytes. Thus, Kaeli and Emma do not teach how to provide target instruction bytes for returns associated with subroutines having multiple callers. A third significant aspect is that an associative dual-stack structure with associated complex interconnect and control is required.

The use of a return address stack in conjunction with a branch prediction cache was also taught in U.S. Pat. No. 5,136,696 ('696), HIGH-PERFORMANCE PIPELINED CENTRAL PROCESSOR FOR PREDICTING THE OCCURRENCE OF EXECUTING SINGLE-CYCLE INSTRUCTIONS AND MULTICYCLE INSTRUCTIONS, to Beckwith et al., issued Aug. 4, 1992. '696 was focussed specifically on the execution of multicycle instructions using microinstructions in an instruction-cache-based interpreter.

In '696, the branch prediction cache was largely conventional, having fields for branch and target addresses and "predictions." The only modification to the branch prediction cache was the addition of a new 2-bit prediction-type field that could designate each entry as either a normal, branch, interpreter call, or interpreter return prediction. The target address field was only used for branch and interpreter call prediction types.

In the absence of multicycle instructions, the branch prediction cache functioned conventionally. In the event of a multicycle instruction, an interpreter call entry was established in the branch prediction cache. Subsequently, if a hit occurred on an entry marked interpreter call prediction, the program counter was loaded from the target address field of the branch prediction cache. Additionally, the return address was pushed onto the return address stack. If a hit occurred on an entry marked interpreter return prediction, the program counter was loaded from the top of the return address stack and not the target address field of the branch prediction cache.

A first significant aspect of the '696 approach is that only one entry is maintained in the branch prediction cache for a return instruction, no matter how many callers the subroutine may have. A second significant aspect is that no provisions are made for the caching of target instruction bytes. Thus, '696 does not teach how to provide target instruction bytes for returns associated with subroutines having multiple callers.

SUMMARY OF THE INVENTION

A Branch Prediction Cache (BPC) in conjunction with a Return Address Stack (RtnStack) selects from among multiple branch address entries for a single return-type (Rtn or Ret) instruction that returns to multiple callers. The BPC has a branch address associative memory (PcCAM), a return address associative memory (RtnCAM), and word line logic used to validate and qualify entries. The PcCAM monitors program addresses for previously stored branch addresses. The RtnStack stores the return addresses for the most recent call-type (CALL) instructions. The RtnCAM stores return addresses associated with the branch addresses stored in the PcCAM, if the branch address was for a return instruction. The PcCAM may have multiple entries with the same branch address, should a return instruction have multiple callers. Otherwise, multiple entries with the same branch address (known as clones) are prevented from being created. The top of the return address stack is input to the RtnCAM. When a program address has multiple matches in the PcCAM, the word line logic uses matches in the RtnCAM to enable only the PcCAM entry that has an associated return address matching the top of stack.

The combination of BPC and RtnStack permits branch prediction to occur early—when only the branch address is known. The branch does not have to be decoded first. This is important to reducing branch delay in processors with aggressive pipeline timing. The instant invention handles all branches, both returns and non-return types. The lines within the BPC are all identical and may be used for either returns or non-return branches. The allocation of BPC lines between return and non-return type branches is dynamic. Lines are assigned (as return or non-return) according to the occurrence of returns and non-returns in the instruction stream. Lines are reclaimed for reassignment by a pseudo-LRU line replacement protocol. Returns involving multiple-level deep nested subroutines are provided for, as are returns having multiple callers. The scheme is readily used with target address, target instruction byte, and branch history arrays, to provide full branch prediction.

Compared to the approaches taught in '507, '947, Kaeli and Emma, and '696, the present invention distinguishes between multiple BPC target address entries for return instructions having multiple callers. In its most basic form, this is done using a simple push-down stack connected to the BPC in a straight-forward manner. The invention provides an overall integrated branch prediction apparatus that handles both return instructions and non-return branch instructions. The instant invention further provides for nested sub-routines of significant depth and can provide target addresses, target instruction bytes, and branch history information early in the pipeline, when only the branch address is known. At the same time, the invention is fully compatible with existing full BPC designs. Thus, the present invention enables extending existing techniques for using a BPC to provide store-into-instruction-stream detection, insure coherency with other levels of the memory hierarchy, manage integrated instruction queues, and support speculative execution (all as taught in the previously mentioned '026, '778, '130, and '068 patents). Such advanced BPC techniques now can benefit from improved branch prediction accuracy for return instructions.

For a fuller understanding of the nature and advantages of the invention, reference should be made to the ensuing detailed description taken in conjunction with the accompanying drawings.

DETAILED DESCRIPTION OF THE INVENTION

Figure 1:
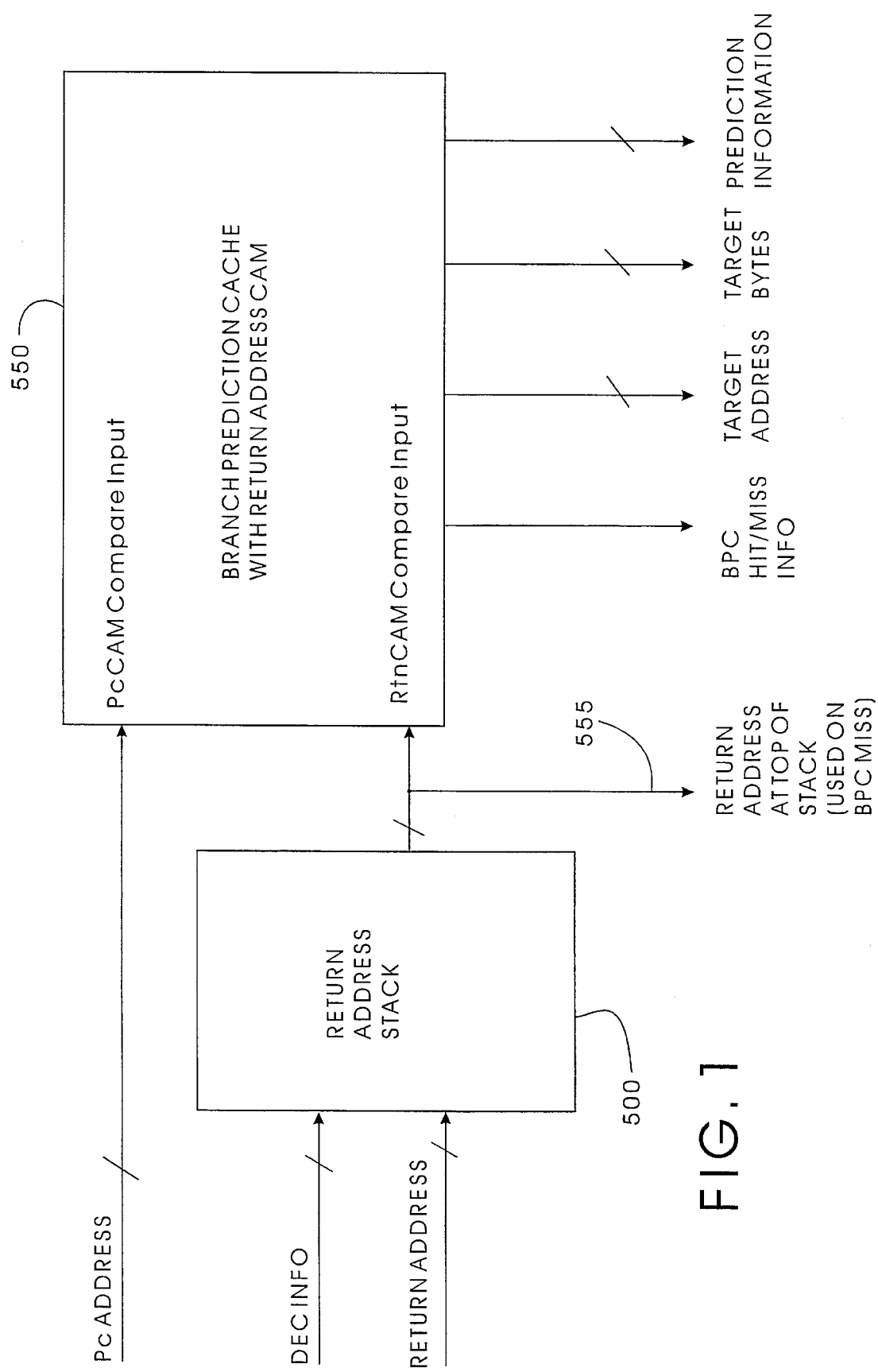
FIG. 1 is an overall block diagram of the BPC and the RtnStack.

The invention comprises: a PcCAM (branch address tag array) 74, RtnCAM 330, and word line logic 450, collectively integrated into a single structure that is designated the Branch Prediction Cache (BPC) 550. The invention further comprises a valid-bit 76, !Rtn-bit (not-return-bit) 390, and a Rtn Stack 500. The BPC 550 is used in an instruction fetch unit responsible for supplying an instruction decode unit with instructions. These units reside in a speculative-execution processor having a pipeline that operates with distributed control. FIG. 1 shows the relationship of the BPC 550 and RtnStack 500 to each other. The invention is interconnected with the instruction fetch and decode units of the processor in a straight-forward manner.

Figure 2A:
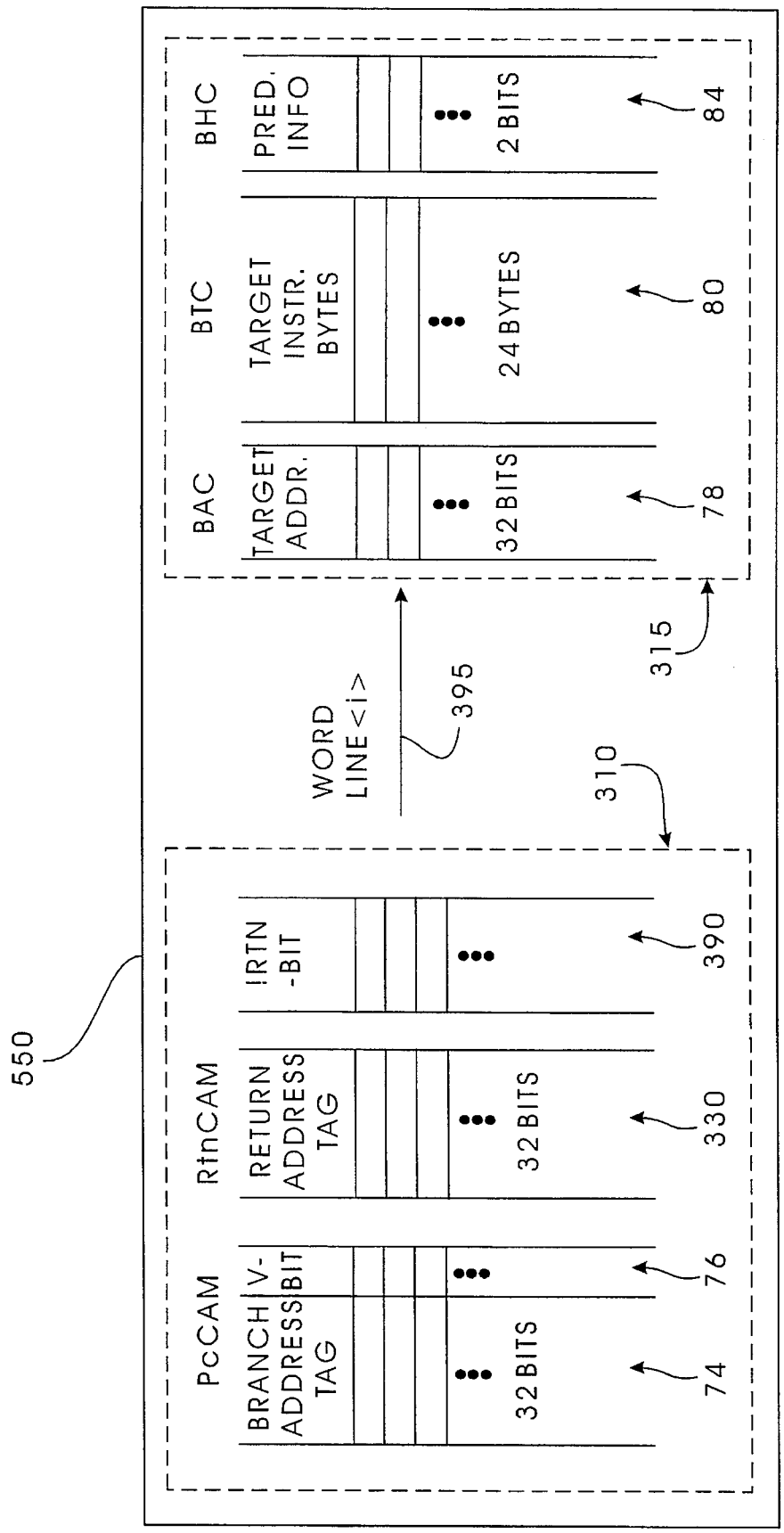
FIG. 2A is a diagram showing the fields within each branch prediction entry.

Each of the PcCAM 74, RtnCAM 330, and word line logic 450, make up a column within a first part 310 of the BPC 550. The BPC 550 may optionally include any combination of a Branch Address Cache (BAC or TAC, for target addresses) 78, a Branch Target Cache (BTC, for target instruction bytes) 80, and Branch History Cache (BHC, for prediction information) 84. Each of these functions may make up a column in the second part 315 of the BPC 550. FIG. 2A conceptually illustrates the columns in the two parts of the BPC 550 and their interrelationship. The first part 310 and second part 315 are coupled via word lines 395. The first part 310 activates one of the word lines 395 to select the corresponding line in the second part for reading.

The entire collection of columns from both parts is also organized horizontally as lines. A line within the BPC is divided into fields corresponding to each column. That is, each field is an entry or cell within one of the BPC columns. All of the fields within a line are associated with a single branch instruction. Non-RET instructions occupy only one line in the BPC. A single RET instruction may have individual lines for each of multiple return addresses.

Figure 2B:
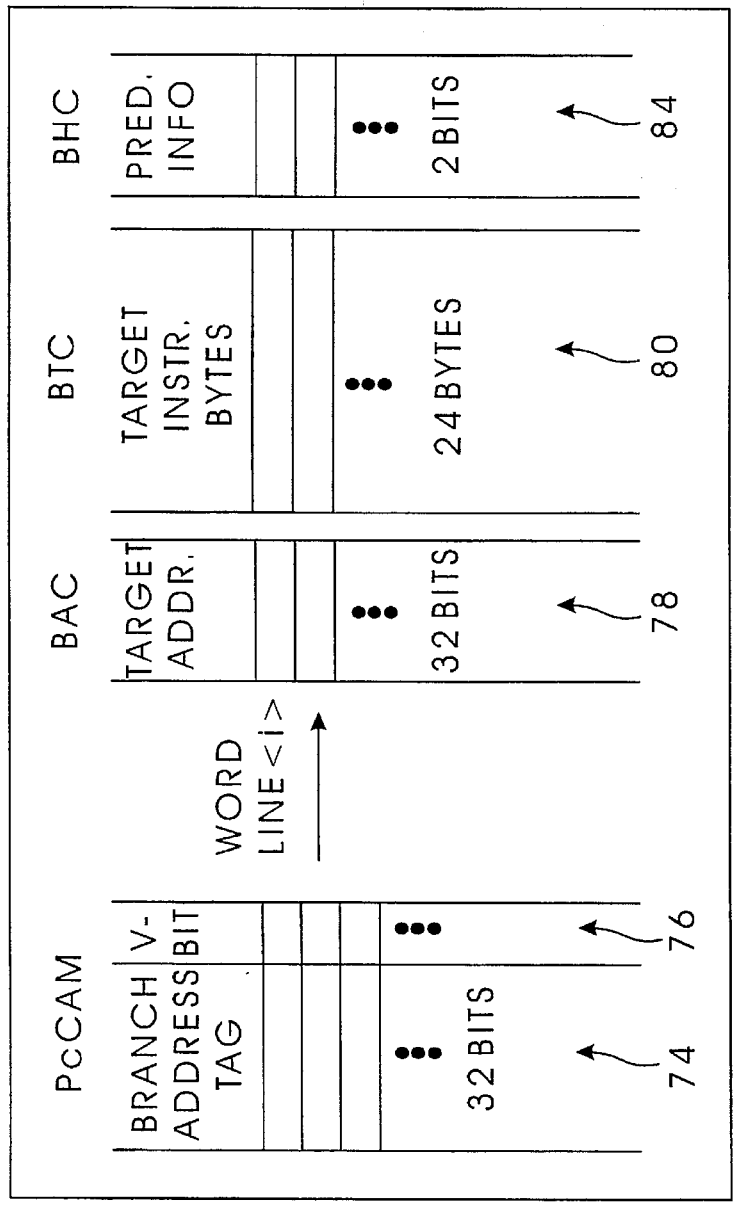
FIG. 2B shows the BPC used in the '778 patent.

As a comparison to the present invention, the BPC of '778 is diagrammed in FIG. 2B. The BAC 78, BTC 80, and BHC 84 of the present invention are identical with those taught in '778, '130, and '068. As such, the BAC 78 also includes a TgtCAM for detecting stores into the instruction-stream and the maintenance of instruction coherency at all levels of the memory hierarchy. The exact combination of BAC 78, BTC 80, and BHC 84 for the second part 315 of the BPC 550 is not critical to the instant invention. In the preferred embodiment, the BPC comprises a PcCAM 74, V-bit 76, RtnCAM 330, !Rtn-bit 390, BAC/TgtCAM 78, and BTC (with valid bits) 80. A BHC is not used, prediction information being provided by a branch correlation table. All branch prediction logic functions, including the BPC 550 and RtnStack 500, are integrated on a single integrated circuit along with processor units responsible for instruction fetch, instruction decode, pipeline control, address preparation, integer execution, and control over the memory and cache subsystems.

Lines marked with a short diagonal indicate multi-bit signals. Multi-bit signals are sometimes also indicated by a bit range suffix, comprising the most significant bit number, a double-period delimiter, and the least significant bit number, all enclosed in angle brackets (e.g., <9..0>). Multi-bit wide components are sometimes indicated by a bit size consisting of a number followed by a capital B (e.g., 13B). It is implied that when a single-bit width signal, such as a clock phase or an enable, is connected to a multi-bit wide component, the single-bit width signal is fanned out to the corresponding number of bits. Single bit taps on a multi-bit signal are drawn with the tap bit identified inside angle brackets. Multi-bit taps from or to a multi-bit signal are drawn with a label (e.g., 4 LSB) indicating the number of bits being tapped and their significance in the wider signal. When merging two or more signals into one, or demerging two or more signals from one, the significance order of the individual component signals within the combined signal is explicitly shown with MSB and LSB labels adjacent to the merge or demerge.

The design uses two-phase (phase 1 and phase 2) non-overlapping clocking. Most of the logic is implemented using transparent d-type latches, which have level-sensitive clock inputs. A latch clocked by phase 1 is called a phase 1 latch. Similarly, a phase 2 latch is one clocked by phase 2. Generally speaking, a latch of a given phase should be driven by a signal that is derived from a latch of the alternate phase. This design restriction greatly reduces the effort required to avoid race conditions. To facilitate the alternate phase rule, often a signal name is given a suffix that is descriptive of the "phaseness" of the signal. E.g., WE_1 is a signal output from a phase 1 latch.

Figure 3:
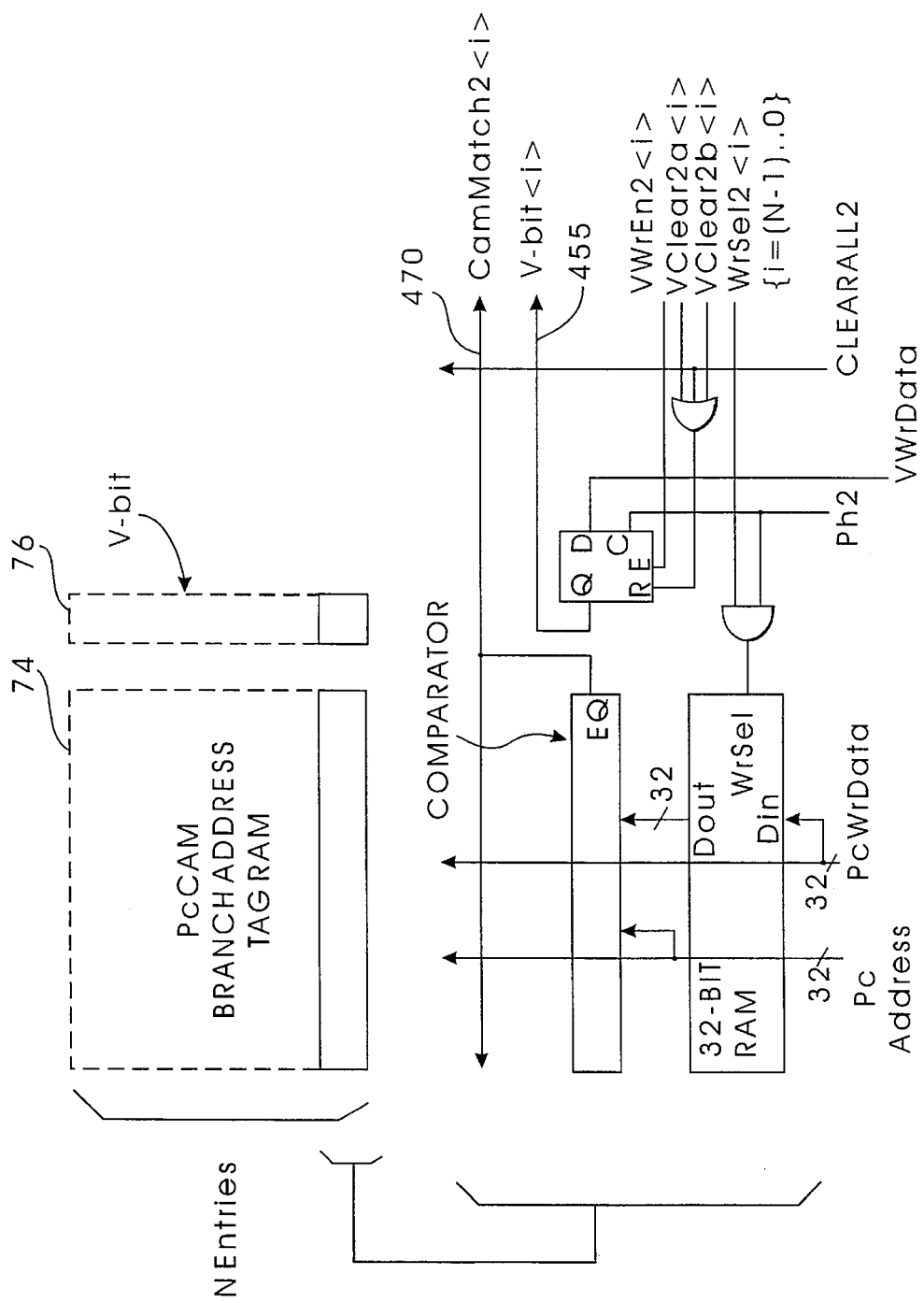
FIG. 3 is a block diagram of a bit-slice of the PcCAM and V-bit internal structure.

FIG. 3 illustrates a bit-slice of the PcCAM 74 and V-bit 76. The branch address RAM, comparator, and V-bit used in the instant invention are identical to those used in the PcCAM of '778, '130, and '068. However, in the instant invention, the V-bit 76 does not directly qualify the output of the tag comparator, as was done in '778, '130, and '068. The output of the comparator is used without qualification as CamMatch2<i> 470, and it along with the V-bit 455, are routed to the word line logic.

Each entry of the PcCAM (for Program Counter Content Addressable Memory) 74 stores the address at which a selected branch instruction is located. A common input for all entries is coupled to monitor program addresses. If a program address matches a stored branch address, the PcCAM 74 signals a match for that entry. Thus the PcCAM 74 is one of multiple tag-logic portions of the BPC 550, and branch addresses are stored as the content of the tags in the PcCAM 74.

Figure 4:
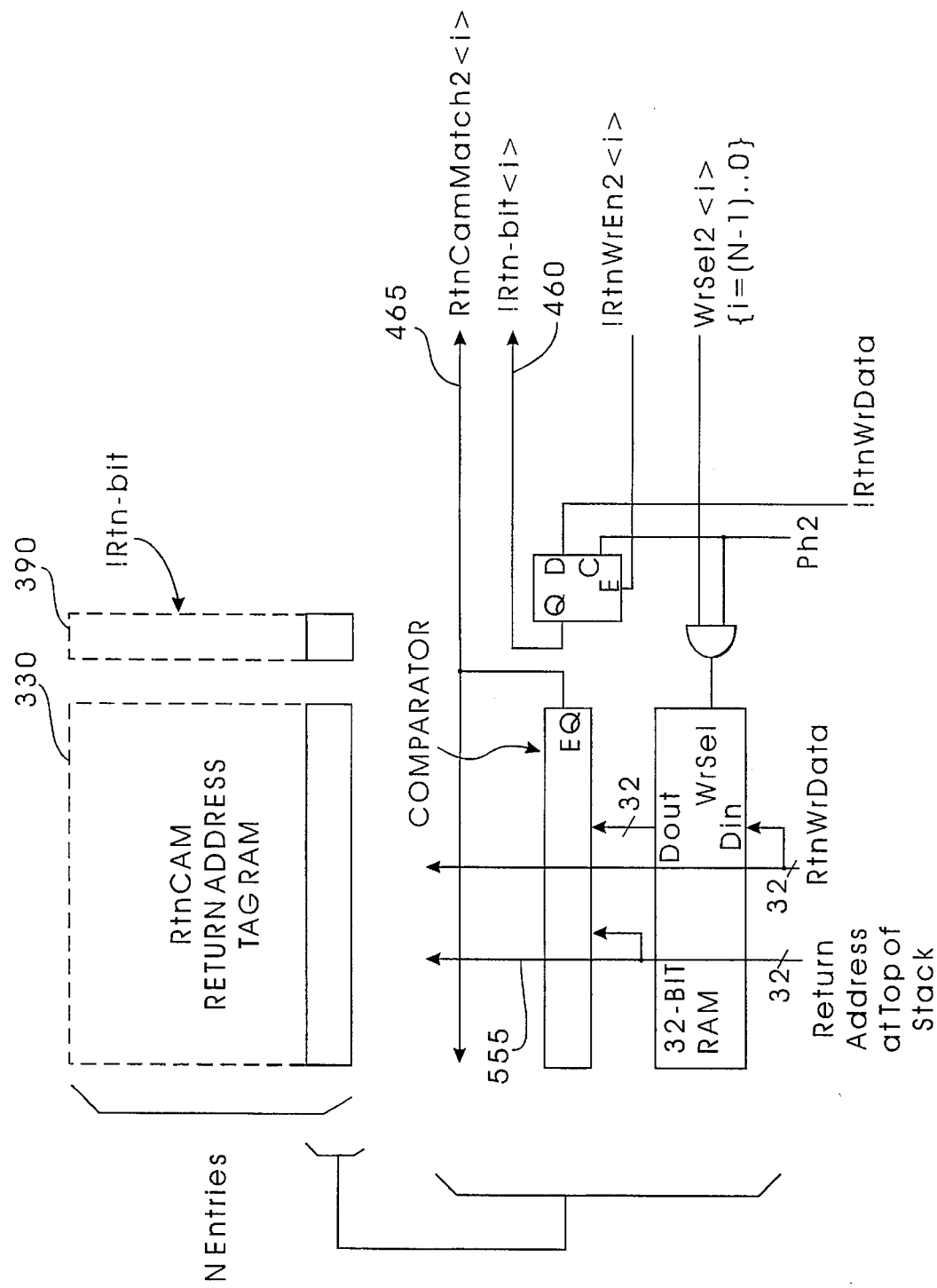
FIG. 4 is a block diagram of a bit-slice of the RtnCAM and !Rtn-bit internal structure.

FIG. 4 shows the internal structure of the RtnCAM 330. Each entry of the RtnCAM 330 stores the target address associated with the branch instruction. The comparator input of all entries is coupled to monitor the top of the return address stack 500. If the top of the stack 500 matches a stored target address, the RtnCAM 330 signals a match for that entry on RtnCamMatch2<i> 465. The RtnCAM 330 and PcCAM (row) write enables are identical. While the write enables are identical, the addresses stored in the two CAMs are different. The PcCAM 74 stores the address of the branch instruction (possibly a return). When the branch stored in the PcCAM 74 is a return, the RtnCAM 330 stores the target address (return address) for the return.

Figure 5:
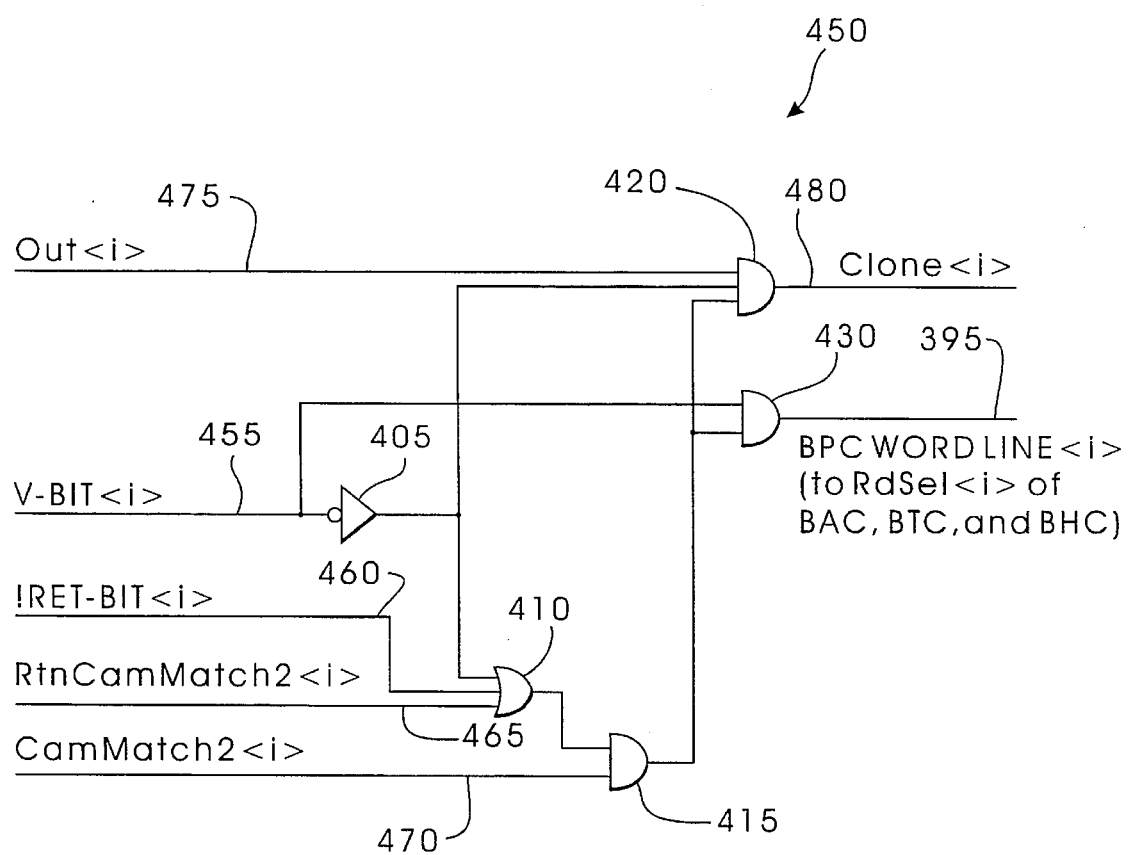
FIG. 5 shows a bit-slice of the combinational logic used to generate the word lines of the BPC.

The word-line logic 450 performs hit qualification using the !RET ("not" RET) bit 460 and the V-bit 455. FIG. 5 shows a bit-slice of the combinational logic within the word line logic 450. The word line logic comprises gates 405, 410, 415, 420, and 430. CamMatch2<i> 470 is the unqualified output of the PcCAM's comparator. RtnCamMatch2<i> 465 is the output of the RtnCAM 330. V-bit<i> 455 indicates if the RtnCAM entry is valid. If the V-bit is set, CamMatch2<i> 470 must be further qualified by either the !RET-bit 460 or by RtnCamMatch2<i> 465. The !RET-bit<i> 460 is used to classify the branch instruction associated with the PcCAM branch address as a return-type instruction or not. If the instruction is a return, then the target address stored in the RtnCAM 330 is a return address. In this event, the word line logic will qualify the hit in the PcCAM 74 with the result of a possible match in the RtnCAM 330. Only if there is a match in both the PcCAM 74 and the RtnCAM 330, will the word line logic generate a hit for that line in the BPC.

Clones are undesirable duplicate entries in the BPC. Logic is devoted to preventing clones. The processor pipeline and the management of the BPC is such that clones are a concern only after the PcCAM has been written, and thus a tentative entry established, but before the V-bit has been set indicating a valid entry. Once the V-bit is set, clone creation is precluded by the fact that the potential clone's address will cause a hit in the PcCAM. Clone detection is thus only a concern while the V-bit is clear. During this time, it is not possible to activate the word line. The !Ret-bit 460 and RtnCamMatch2 465 are ignored while the V-bit 455 is clear and CamMatch2<i> 470 is essentially coupled to AND gate 420 for clone detection. Signal Out<i> 475 indicates when active that the line corresponds to a branch that is outstanding (i.e., issued, but the taken/not-taken status is unresolved), or about to become so. Clone<i> 480 is activated when a potential clone situation is detected. The BPC control logic is thereby made aware that an entry is already being established for the branch address activating the Clone<i> signal 480.

The RtnStack 500 stores the return addresses for the most recent CALL instructions. The present embodiment has seven entries. A hardware pointer is used to identify the stack top. The pointer and an array of latches emulate a physical LIFO stack. The particular method used to implement the stack 500 is not critical to the invention. When a CALL instruction is decoded, the physical address of the next sequential instruction is pushed onto the stack 500. The stack 500 is popped when a Rtn instruction is decoded. If allowed to underflow, the address prediction would be incorrect and performance would be degraded. To avoid this, the stack 500 has empty-condition detection logic. When the stack 500 is empty, no address predictions are made for any return instructions. A special bypass is provided to handle properly a CALL directly to a Rtn. The BPC 550 was designed for use in a processor that uses out-of-order (speculative) execution. To support out-of-order execution, there are provisions to restore properly the stack-top pointer and the empty detection logic, following an abort.

ENTRY CREATION

The PcCAM 74 and RtnCAM 330 fields are written before the potential branch (which may be a Rtn) is decided. At this time, the V-bit 455 is off and Word Line <i> 395 depends only on CamMatch2<i> 470. This allows proper clone detection if the instruction is a branch but is not a return, as discussed supra. When the V-bit 455 is set, creating the complete entry, the !Rtn-bit<i> 460 is clear, if the branch is a return, and set otherwise. This allows subsequent BPC 550 actions to ignore RtnCamMatch2<i> 465, if the branch is not a return. If the branch is a return, then RtnCamMatch2<i> 465 is included in determining whether or not there is a hit in the BPC.

When an instruction is not a return, a clone or validated CamMatch2 indication will preclude the creation of multiple entries with the same branch address. Thus redundant branch address entries are prevented and the BPC is efficiently managed. When an instruction is a return, multiple entries with the same branch address are desired, provided each of the multiple entries has a unique return address associated with it. In this manner, multiple entries are created for exactly the same return instruction, when it returns to multiple callers. This enhances branch prediction accuracy and permits target instruction bytes to be stored for each unique return address.

HIT ON ENTRY

The decode PC address and the return address at the top of the RtnStack are continuously applied to the PcCAM 74 and RtnCAM 330 inputs, respectively, of the BPC 550. As previously described, the !RET-bit<i> 460 is set for all entries corresponding to branches that are not returns. Thus RtnCamMatch2<i> 465 is ignored, and the logic functions identically to the '778, '068, and '130 BPCs that do not distinguish return instructions. For a return, the !Ret-bit<i> 460 is clear, requiring the return address at the top of the return stack to match that stored in the RtnCAM 400, to signal a BPC line hit. This distinguishes possible multiple entries for the same Rtn instruction called from multiple places.

REPLACEMENT POLICY

The choice of replacement policy for entries in the PcCAM 74 is not essential to making or using the instant invention and will not be detailed here. The present embodiment uses a pseudo-LRU technique. Since the entries in the RtnCAM 330 and hit logic are logically and physically coupled to each entry in the PcCAM 74, entries in these structures are treated as part of the same line as their associated PcCAM entry. The entire line is replaced as a group.

ALTERNATE EMBODIMENT

Figure 6:
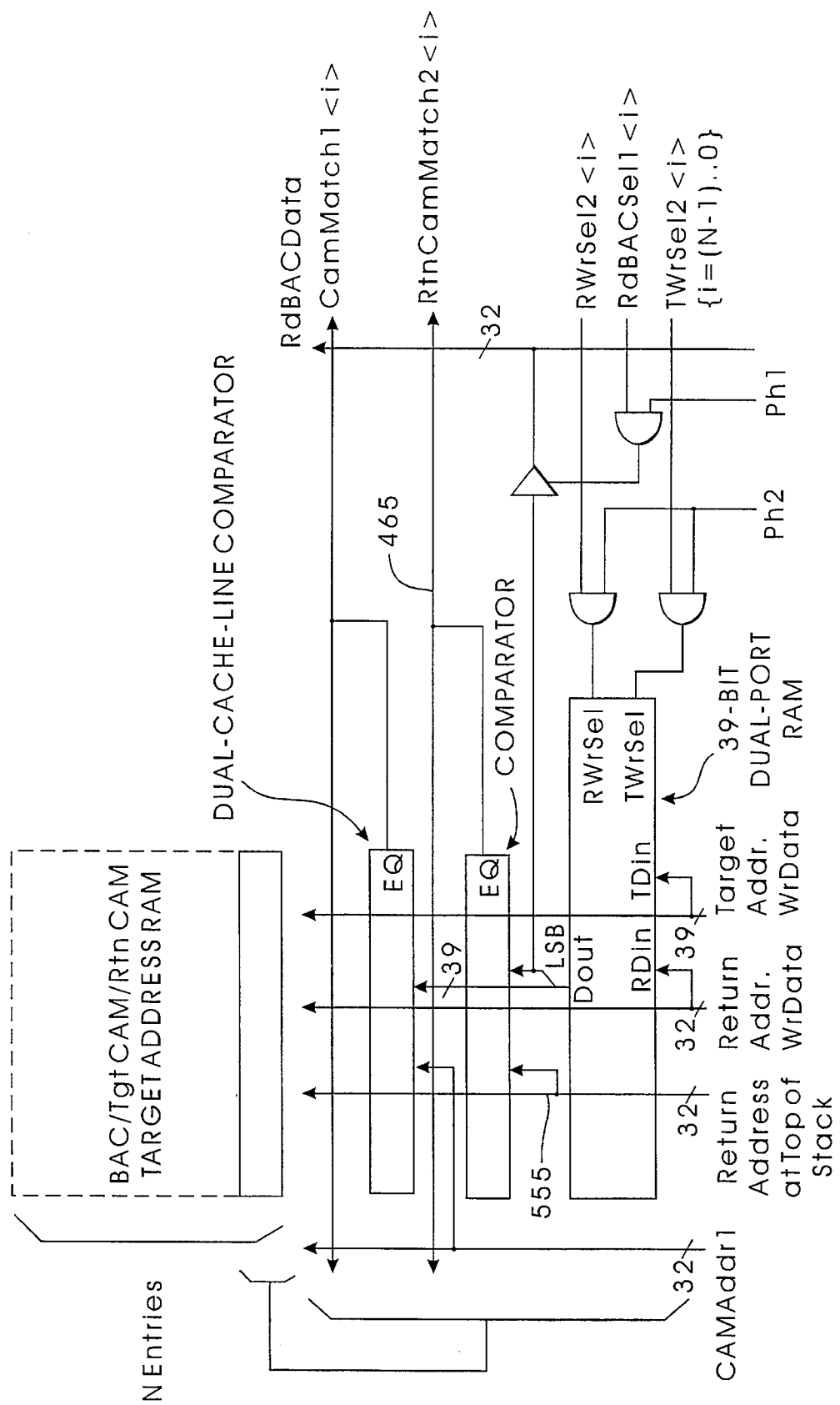
FIG. 6 illustrates a bit-slice of an alternate embodiment, which combines the RtnCAM with a BAC/TgtCAM.

In a prophetic alternate embodiment, the RtnCAM is combined with a BAC/TgtCAM. FIG. 6 illustrates this alternate embodiment. This combination is possible, because (at least part of) the target address of a return stored in the BAC is the same as the return address stored in the RtnCAM. (The target address may comprise more than the return address due to target instruction bytes spanning two cache lines as discussed infra and in '130.) Two separate comparators are still required, if TgtCAM functionality is also desired. CamMatch1<i> indicates a match on address CAMAddr1. RtnCamMatch2<i> 465 functions as described previously.

The dual-cache-line comparator is necessary because instruction bytes in the BTC are allowed to span two cache lines and instruction coherency is desired at all levels of the memory hierarchy. The comparator and RAM must be 39-bits wide to cover both cache lines. The implementation of such a dual-cache-line comparator and the rationale for its use is taught in '130.

The RAM is dual-ported as shown, with separate data inputs and write enables. This is a consequence of the aggressive pipeline timing of the machine. There are cycles when it is desirable to write a return address into one line while simultaneously updating a cache-line address in another line. The RWrSel2<i> signal is identical in function and timing with the write select used for the PcCAM. The TWrSel2<i> is identical in function and timing with the WrSel2<i> signal used for the BAC/TgtCAM in '130.

Although the present invention has been described using particular illustrative embodiments, it will be understood that many variations in construction, arrangement and use are possible within the scope of the invention. For example, while physical addresses were used in the disclosed embodiments, linear addresses or virtual addresses could have been used instead. The address stored in the PcCAM need not be that of the branch itself, but need only be related to the branch in some well-defined way. RAM details, such as the number of RAM ports and the width of an entry, might be varied. RtnStack details, such as its depth or the method of implementation, may be changed. It is known in the art that other instructions can be used to perform procedure calls and returns besides "pure" call and return instructions. Hence, the instant invention is not limited in scope to the pure call and return instructions used in this disclosure. Likewise, the associative memories may be fully-associative, set-associative, or direct mapped. The term CAM should therefore be construed as encompassing all associativities. Also, the number of streams involved in speculative execution may vary, or speculative execution may not be used at all. The exact combination of BAC, BTC, and BHC, may be varied, and the BAC need not include a TgtCAM. The present invention is thus to be considered as including all possible modifications and variations encompassed within the scope of the appended claims.

We claim:

1. Branch prediction logic, comprising:
   (a) a tag RAM;
   (b) a return address comparator coupled to said tag RAM;
   (c) a branch address associative memory; and
   (d) word line logic generating word line outputs upon coincident corresponding match indications by said branch address associative memory and said return address comparator.

2. Branch prediction logic as in claim 1, further comprising a return address stack coupled to said return address comparator.

3. Branch prediction logic as in claim 2, further comprising a branch address cache coupled to said word line outputs.

4. Branch prediction logic as in claim 2, further comprising a branch history cache coupled to said word line outputs.

5. Branch prediction logic as in claim 2, further comprising a branch target cache coupled to said word line outputs.

6. Branch prediction logic as in claim 3, further comprising a branch target cache coupled to said word line outputs.

7. Branch prediction logic as in claim 6, further comprising a branch history cache coupled to said word line outputs.

8. Branch prediction logic as in claim 1, further comprising a target address comparator coupled to said tag RAM and having outputs signaling detection of a write to a target instruction byte of a branch having an entry in said branch address associative memory.

9. Branch prediction logic as in claim 8, further comprising a return address stack coupled to said return address comparator.

10. Branch prediction logic as in claim 9, further comprising a branch address cache coupled to said word line outputs.

11. Branch prediction logic as in claim 9, further comprising a branch history cache coupled to said word line outputs.

12. Branch prediction logic as in claim 9, further comprising a branch target cache coupled to said word line outputs.

13. Branch prediction logic as in claim 10, further comprising a branch target cache coupled to said word line outputs.

14. Branch prediction logic as in claim 13, further comprising a branch history cache coupled to said word line outputs.

15. A branch prediction cache, comprising:
 (a) a branch address associative memory having branch address match outputs;
 (b) a hybrid return address and target address associative memory comprising:
  (b1) a target address tag RAM having an output;
  (b2) a return address comparator having a tag input coupled to at least part of said tag RAM output, a return address check input coupled to a return address input, and a return address match output; and
  (b3) a target address comparator having a tag input coupled to said tag RAM output, a target address check input coupled to a write address input, and a target address match output; and
 (c) word line logic having word line outputs, wherein one of said word line outputs will go active for a given line when said line's branch address match output and return address match output are simultaneously active.

16. A branch target address prediction device that selects between multiple cached target addresses for return instructions with multiple callers, comprising:
 (a) a stack, said stack storing a selection of return addresses associated with the most recent CALL instructions, said stack having a stack top, the return address at said stack top being provided as a stack output;
 (b) a branch address associative memory, having a first plurality of entries, each of said first plurality of entries having match outputs;
 (c) a return address associative memory, having a second plurality of entries, each of said second plurality of entries having match outputs; said return address associative memory further having a return address input common to said second plurality of entries, said return address input coupled to said stack output; and
 (d) word line logic, said word line logic having a third plurality of word line outputs and storage for indicating if each of said third plurality of word line outputs is associated with a return instruction, said word line logic requiring coincident matches from corresponding entries in said branch address associative memory and said return address associative memory in order to activate the corresponding word line output, if said word line is associated with a return instruction;
 whereby multiple target addresses for return instructions with multiple callers can be distinguished between for purposes of branch prediction.

17. A method of performing branch prediction, comprising the steps of:
 (a) storing branch addresses of select branch instructions in a branch address associative memory;
 (b) storing target addresses of at least some of said select branch instructions in a tag RAM;
 (c) comparing a return address with at least part of said stored target addresses in a return address comparator and conditionally generating a match;
 (d) presenting a branch address to said branch address associative memory and conditionally generating a match; and
 (e) activating a word line output upon coincident corresponding match indications by said branch address associative memory and said return address comparator.

18. A method of performing branch prediction as in claim 17, further comprising the step of comparing a write address with said stored target addresses in a target address comparator and conditionally signaling detection of a write to a target instruction byte.

19. A method of managing a branch prediction cache, comprising the steps of:
 (a) creating an entry for a branch instruction;
 (b) preventing the subsequent creation of additional entries for said branch instruction, if said branch instruction is not a return; and
 (c) subsequently creating additional entries for said branch instruction, if said branch instruction is a return having multiple callers.

20. The method of managing a branch prediction cache of claim 19, wherein each of the multiple entries for said return having multiple callers has:
 (a) a branch address associative memory field having the same branch address value; and
 (b) a return address associative memory field having a unique return address value.

21. The method of managing a branch prediction cache of claim 20, further comprising the step of accurately identifying the branch information for said return having multiple callers by distinguishing between said multiple entries for said return by simultaneous corresponding matches by said return address associative memory and said branch address associative memory.

22. A method of performing branch prediction in a processor, comprising:
 (a) pushing the next sequential instruction address following each call instruction onto a return address stack, said stack having a top, said next sequential instruction address being a return address, whereby said stack may contain one or more return addresses;
 (b) popping one of said return addresses off said return address stack for each return instruction decoded;
 (c) creating a BPC line for a branch instruction having a unique combination of branch instruction address and branch target address, said BPC line comprising:
  (c1) said branch instruction address stored in a branch address associative memory;
  (c2) said branch target address stored in a return address associative memory; and
  (c3) status information, said status including classification of said branch instruction as a return instruction or not,
 such that a plurality of BPC lines may exist with identical branch instruction addresses and multiple branch address associative memory matches may occur per branch instruction address;
 (d) monitoring instruction addresses with said branch address associative memory;

(e) monitoring said stack top with said return address associative memory; and (f) generating a single BPC line hit from among said multiple branch address associative memory matches by qualifying said branch address associative memory matches with a return address associative memory match and said status information;

whereby multiple target addresses associated with return instructions having multiple callers can be distinguished.

23. A method of performing branch prediction in a processor, comprising:

(a) maintaining a return address stack, said stack having a stack top;

(b) maintaining a BPC, said BPC having a plurality of lines comprising a branch address associative memory field, a return address associative memory field, and status information conditionally indicating that said line is associated with a return instruction;

(c) maintaining a subset of said plurality of BPC lines for a return instruction having multiple callers, each of said return instruction's lines being associated with a unique branch target address of said return instruction;

(d) monitoring instruction addresses with said branch address associative memory field of said BPC lines;

(e) monitoring said stack top with said return address associative memory field of said BPC lines; and (f) generating a hit for one of said subset of BPC lines for a return instruction when coincident branch address associative memory and return address associative memory matches occur within said single line of said subset.

24. A method of performing branch prediction in a processor, comprising:

(a) providing a branch prediction cache comprising a branch address associative memory and a return address associative memory, said associative memories being organized as fields within a plurality of identical cache lines;

(b) presenting the branch address of a branch instruction to said branch address associative memory;

(c) presenting a return address to said return address associative memory;

(d) conditionally detecting a clone or hit on said branch address, in a first subset of said plurality of identical cache lines designated as not being associated with a return instruction, if any;

(e) conditionally detecting a clone or hit on the combination of said branch address and said return address, in a second subset of said plurality of identical cache lines designated as being associated with a return instruction, if any;

(f) in the event that no clone or hit was detected, allocating one line of said plurality of identical lines for said branch instruction; and (g) conditionally designating said one line as being associated with a return instruction and storing a return address in said return address associative memory field of said one line, if said branch instruction is a return;

whereby the allocation of cache lines between return and non-return type branches is dynamic and multiple lines are allocated per branch instruction only for return instructions having multiple callers.

25. The method of performing branch prediction in a processor of claim 24 wherin said allocating is a pseudo-LRU replacement of an already allocated line, if no lines are unallocated.

* * * * *